(12) United States Patent
Johnson et al.

(10) Patent No.: US 11,749,826 B2
(45) Date of Patent: Sep. 5, 2023

(54) THERMO-ELECTROCHEMICAL CONVERTER HAVING DENSE METAL ELECTRODE

(71) Applicant: JTEC ENERGY, INC., Atlanta, GA (US)

(72) Inventors: Lonnie G. Johnson, Atlanta, GA (US); David Ketema Johnson, Douglasville, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 179 days.

(21) Appl. No.: 17/410,259

(22) Filed: Aug. 24, 2021

(65) Prior Publication Data
US 2022/0059859 A1 Feb. 24, 2022

Related U.S. Application Data

(60) Provisional application No. 63/069,380, filed on Aug. 24, 2020.

(51) Int. Cl.
| | |
|---|---|
| *H01M 8/18* | (2006.01) |
| *H01M 8/1004* | (2016.01) |
| *H01M 14/00* | (2006.01) |
| *H01M 6/36* | (2006.01) |

(52) U.S. Cl.
CPC ............. *H01M 8/182* (2013.01); *H01M 6/36* (2013.01); *H01M 8/1004* (2013.01); *H01M 14/00* (2013.01); *H01M 2250/40* (2013.01)

(58) Field of Classification Search
None
See application file for complete search history.

(56) References Cited

U.S. PATENT DOCUMENTS

| | | | |
|---|---|---|---|
| 5,470,669 A | * | 11/1995 | Ludwig ................. H01M 8/182 204/220 |
| 6,632,849 B1 | | 10/2003 | Yao et al. |

(Continued)

FOREIGN PATENT DOCUMENTS

KR    20190023671    *  3/2019

OTHER PUBLICATIONS

KR 20190023671 English translation. Lee et al. Korea. Mar. 8, 2019. (Year: 2019).*

(Continued)

*Primary Examiner* — Christopher P Domone
(74) *Attorney, Agent, or Firm* — Panitch Schwarze Belisario & Nadel LLP

(57) ABSTRACT

A heat to electricity converter including a working fluid and a pair of membrane electrode assemblies (MEA) is provided. Each MEA includes a pair of electrodes which are electron conductive and permeable to the working fluid, and a thin film electrolyte membrane sandwiched between the electrodes. The membrane is conductive of ions of the working fluid and has a thickness of 0.03 μm to 10 μm. At least one electrode of each MEA includes a non-porous and dense metal. One electrode of each MEA is in contact with the working fluid at a first, higher pressure, while the other electrode is in contact with the working fluid at a second, lower pressure. The first MEA is configured to compress the working fluid from the second pressure to the first pressure, while the second MEA is configured to expand the working fluid from the first pressure to the second pressure.

15 Claims, 7 Drawing Sheets

(56) References Cited

U.S. PATENT DOCUMENTS

| | | | |
|---|---|---|---|
| 7,160,639 B2 | 1/2007 | Johnson et al. | |
| 9,046,784 B2 | 6/2015 | Wang et al. | |
| 2010/0132386 A1* | 6/2010 | Bahar | F25B 1/00 |
| | | | 62/115 |
| 2012/0064419 A1* | 3/2012 | Johnson | H01M 8/04955 |
| | | | 429/408 |
| 2012/0129039 A1 | 5/2012 | Drenckhahn et al. | |
| 2018/0108960 A1* | 4/2018 | Johnson | H01M 8/04089 |
| 2020/0014053 A1 | 1/2020 | Johnson | |

OTHER PUBLICATIONS

Kondyurin et al., "Nanostructured Carbonized Thin Films Produced by Plasma Immersion Ion Implantation of Block-Copolymer Assemblies," Plasma Processes and Polymers, vol. 5, No. 2, pp. 155-160 (2008).

Aoki et al., "Thin Film Fuel Cell Based on Nanometer-Thick Membrane of Amorphous Zirconium Phosphate Electrolyte," Journal of the Electrochemical Society, vol. 158, No. 8, pp. B866-B870 (2011).

Yin et al., "A Review on the Production and Purification of Biomass-Derived Hydrogen Using Emerging Membrane Technologies," Catalyst, vol. 7, No. 10, pp. 1-31 (2017).

Melendez et al., "Preparation and Characterization of Ceramic Supported Ultra-Thin (approximately 1 μm) Pd-Ag Membranes," Journal of Membrane Science, vol. 528, pp. 12-23 (2017).

Int'l Search Report and Written Opinion dated Dec. 23, 2021 in International Application No. PCT/US2021/047245.

* cited by examiner

| Supplier | Material | Dimension Parameters | Applications | Performance |
|---|---|---|---|---|
| Hysep-Energy research centre of The Netherlands | Pd-Au/YSZ/SS | 0.04/0.1/0.5 m² | Example: Coal to fuel project in New Zealand | 3.5-6 Nm³/h with 90.5-99.995% hydrogen at 21 Bar pressure difference, from 35% reforming H₂ |
| Power + Energy/United Technologies Research Center Tokyo Gas | Pd-Cu trametallic alloy | - | Coal gasification Syngas reforming | 0.23 mol/m² s with 99.9999% hydrogen |
| CRI/Criterion-Shell | Pd-Y(Gd)-Ag/SS | OD 2 inch L.48 inch | - | 40 Nm³/h with 90-99% hydrogen 40-70 Nm³/h m² h¹ bar⁰·⁵ with >99% hydrogen |
| REB | Pd and Pd-alloy | OD 1/8 inch | fluidized bed membrane reactor | 0.2 mol/m² s on Pd-Cu alloy membrane at 673K, 3.03 Bar of syngas conditions |

Normal cubic meter (Nm3) - Temperature: 0 °C, Pressure: 1.01325 barA.

Fig. 3

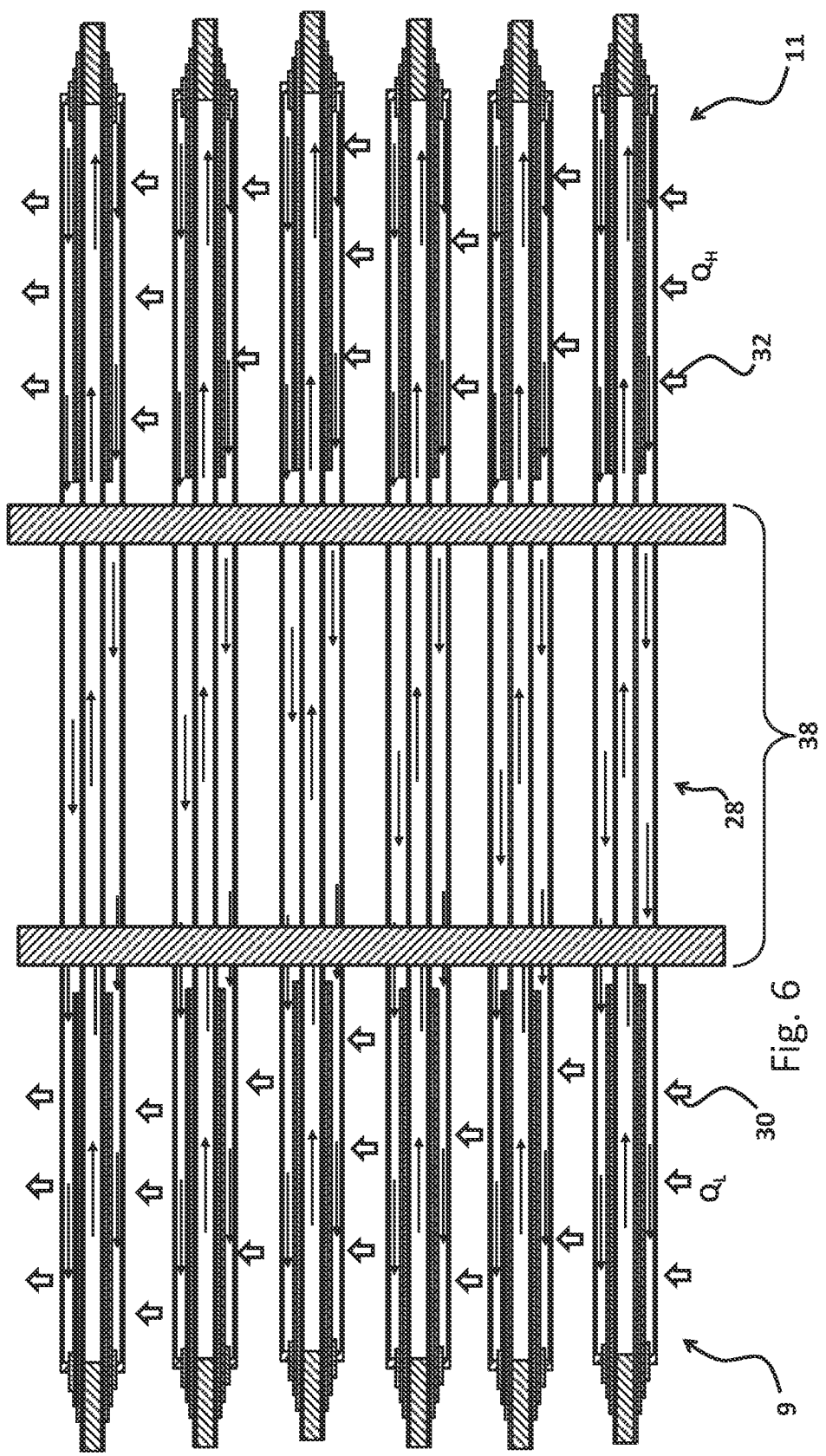

THERMO-ELECTROCHEMICAL CONVERTER HAVING DENSE METAL ELECTRODE

CROSS-REFERENCE TO RELATED APPLICATIONS

This application claims priority to U.S. Provisional Patent Application No. 63/069,380, filed Aug. 24, 2020, the entire disclosure of which is herein incorporated by reference.

BACKGROUND OF THE INVENTION

Membrane Electrode Assemblies (MEA) having an ion conductive membrane sandwiched between two electrodes are employed a number of electrochemical applications. Most common applications are batteries, fuel cells and gas separation processes, such as hydrogen or oxygen separation. In general, an ionizable working fluid passes through an MEA by being oxidized on the entering side, whereby electrons are separated from atoms. The resulting ions are conducted through the membrane to the electrode on the opposite side, also known as the exiting side. The electrons, on the other hand, are conducted through an external circuit to the electrode on the opposite side. The ions are reduced as they recombine with the electrons in the electrode on the exiting side.

It is generally desirable to have the ionizable working fluid pass through the MEA as efficiently as possible. Resistance to the passage of the ionizable working fluid through the membrane is problematic in essentially all applications of interest. For example, in hydrogen or oxygen gas separation applications, a greater pressure drop across the membrane as the working fluid passes through the membrane means that a greater amount of energy, and thus higher cost, is required to supply the source gas at an increased pressure.

A similar situation exists with fuel cells. The most common type of fuel cells are proton exchange membrane fuel cells which employ MEAs having a proton conductive membrane (PCM). This class of fuel cells supplies hydrogen to one of the electrodes and oxygen to the other. The hydrogen ions are conducted through the PCM to the oxygen side of the fuel cell under the chemical reaction potential of the hydrogen and oxygen. The electrons involved in the chemical reaction are conducted from the hydrogen electrode to the oxygen electrode through an external load. The electrons and hydrogen ions reconstitute hydrogen and complete the reaction with oxygen on the oxygen side of the cell, resulting in the production of water which is expelled from the fuel cell system. A continuous electrical current is maintained by a continuous supply of hydrogen and oxygen to the fuel cell.

Alkali Metal Thermo-Electrochemical Conversion (AMTEC) cells have been designed as thermo-electrochemical heat engines. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas.

A Johnson Thermo-Electrochemical Converter (JTEC) system (disclosed in U.S. Pat. No. 7,160,639 filed Apr. 28, 2003) is also a thermo-electrochemical heat engine that uses MEAs to convert heat into electrical energy. The JTEC uses a pair of MEA stacks, and more particularly hydrogen concentration cells, connected in a back-to-back configuration, one at a relatively high temperature and one at a relatively low temperature. Hydrogen circulates within the engine between the two MEA stacks via a counter flow recuperative heat exchanger. The low-temperature MEA stack, coupled to a heat sink, functions as an "electrochemical compressor" stage of the engine, while the high-temperature MEA, coupled to a heat source, functions as an "electrochemical expansion" stage of the engine. As in any thermodynamic engine, the expansion process occurring at high temperature produces enough power to drive the compression process occurring at low temperature, as well as supply net output power to an external load.

However, this conventional engine design is often made complicated by the need for a large membrane to electrode surface area ratio and the need for a significant number of cells to be electrically connected in series in order to achieve practical output voltage levels. Specifically, unlike conventional fuel cells, where the open circuit voltage can be greater than 1V, in the thermo-electrochemical heat engines, the net output voltage generated by the difference in Nernst voltage between the high-temperature and low-temperature MEAs from the hydrogen pressure ratio is in the range of only about 0.1 Volts at moderate high- and low-pressure operating conditions. As such, a number of cells generally have to be connected in series to achieve useful output voltage levels. In addition, the internal impedance of the MEA pair has a significant impact on the output power capability.

The principal efficiency losses associated with MEAs are gas pressure flow losses into and out of the porous electrodes, the activation energy required to oxidize and reduce the working fluid at the electrode/membrane interface, and the impedance to ion conduction through the membrane. Pressure losses associated with gas flow are addressed by optimizing the thickness of the electrodes, the pore size and pore distribution. Activation losses are, generally, fixed material properties. Efforts to minimize activation energy losses typically focus on optimizing catalyst loading and distribution, as well as the type of catalyst used.

Depending on the application, impedance to ion conduction through the membrane is a material property. In order to achieve efficient energy conversion, it is desirable for membranes to have high gas diffusion barrier properties, because diffusion of a working fluid (e.g., hydrogen gas) under a pressure differential across the membrane results in reduced electrical output and efficiency. The membranes utilized must also have good ion conductivity. However, many of the known and available membrane materials that have good ion conductivity, such as Nafion manufactured by the DuPont Corp., generally have very poor molecular diffusion barrier properties. Low molecular barrier properties result in a need to use thicker membranes in order to suppress diffusion which, in turn, results in higher conductive resistance and is, therefore, self-defeating. Conversely, known and available membrane materials that have high molecular diffusion barrier properties generally have relatively low ionic conductivity, and use of such materials would result in high system impedance and associated high polarization losses. As such, thin membranes are needed in order to achieve practical power density and large membrane areas are needed to achieve practical levels of power, while minimizing internal resistive polarization losses.

Accordingly, there is a need for a practical way of using available high barrier, low conductivity membrane materials to provide a thermo-electrochemical heat engine that can approximate a Carnot equivalent cycle, that can operate over a wide range of heat source temperatures, and that eliminates the reliability and inefficiency problems associated with mechanical engines. The solid-state heat engine of the present invention fulfills this need.

BRIEF SUMMARY OF THE INVENTION

In one embodiment, the present invention relates to a heat to electricity converter comprising including an ionizable working fluid, and a first membrane electrode assembly and a second membrane electrode assembly electrically coupled to each other. Each membrane electrode assembly includes a first electrode which is conductive of electrons and permeable to the ionizable working fluid, a second electrode which is conductive of electrons and permeable to the ionizable working fluid, and a thin film electrolyte membrane sandwiched between the first electrode and the second electrode. The thin film electrolyte membrane is conductive of ions of the ionizable working fluid and has a thickness of 0.03 μm to 10 μm. At least one of the first and second electrodes of each membrane electrode assembly comprises a non-porous and dense metal. Due to a working fluid pressure differential applied across each membrane electrode assembly, one of the first and second electrodes of each membrane electrode assembly is in contact with the working fluid at a first pressure and the other of the first and second electrodes of each membrane electrode assembly is in contact with the working fluid at a second pressure which is lower than the first pressure. The first membrane electrode assembly is configured to expand the working fluid from the first pressure to the second pressure, and the second membrane electrode assembly is configured to compress the working fluid from the second pressure to the first pressure.

According to the preceding embodiment, the first and second membrane electrode assemblies operate at different temperatures from each other. Electrical power is applied to the second membrane electrode assembly to the pump working fluid therethrough to the higher pressure to maintain a pressure differential, as heat is removed therefrom, and thus the second membrane electrode assembly operates at a first voltage. The first membrane electrode assembly is also subjected to the pressure differential and the working fluid expands therethrough to the lower pressure, as heat is supplied thereto, and thereby operates at second voltage which is different from the first voltage.

In one embodiment, which may be combined with any of the preceding embodiments, the non-porous and dense metal is layered or mounted onto a porous substrate.

In one embodiment, which may be combined with any of the preceding embodiments, at least one of the first and second electrodes of at least one of the first and second MEAs comprises catalyst configured to promote oxidation and reduction of the working fluid as the working fluid passes through the respective thin film electrolyte membrane.

In one embodiment, which may be combined with any of the preceding embodiments, at least one of the first and second electrodes of at least one of the first and second MEAs comprises palladium or an alloy thereof.

In one embodiment, which may be combined with any of the preceding embodiments, the heat to electricity converter further comprises a recuperative heat exchanger which couples flow of the working fluid at the first pressure and the second pressure between the first and second MEAs.

In one embodiment, which may be combined with any of the preceding embodiments, the heat to electricity converter has a tubular configuration.

In one embodiment, which may be combined with any of the preceding embodiments, each of the first and second MEAs has a tubular configuration.

In one embodiment, which may be combined with the preceding embodiment, an interior of each of the first and second MEAs constitutes a first conduit for flow of the working fluid at the first pressure.

In one embodiment, which may be combined with the preceding embodiment, the heat to electricity converter further comprises a housing at least partially surrounding the first and second MEAs, and a space between the first and second MEAs and the housing constitutes a second conduit for flow of the working fluid at the second pressure.

In one embodiment, which may be combined with any of the preceding embodiments, one of the first and second electrodes is electrically common to both of the first and second MEAs.

In one embodiment, which may be combined with any of the preceding embodiments, the heat to electricity converter further comprises an external circuit for electrically coupling the first and second MEAs.

In one embodiment, which may be combined with any of the preceding embodiments, the present invention relates to a heat to electricity converter system comprising a plurality of the converters described above, the plurality of converters being coupled between a first stream of the working fluid at a first temperature and a second stream of the working fluid at a second temperature which is lower than the first temperature.

In one embodiment, which may be combined with any of the preceding embodiments, the present invention relates to a method of generating electricity using the heat to electricity converter described above as a heat pump. The method comprises coupling the first membrane electrode assembly to a heat source at a first temperature and coupling the second membrane electrode assembly to a heat sink at a second temperature, the first temperature being lower than the second temperature, applying electrical power to the second membrane electrode assembly to pump the working fluid from the second pressure to the first pressure with heat being removed at the second temperature and a first voltage, and extracting power from the first membrane electrode assembly as the working fluid expands from the first pressure to the second pressure with heat being supplied thereto at the first temperature and a second voltage, the first voltage being higher than the second voltage.

In one embodiment, which may be combined with the preceding embodiment, the method further comprises connecting an external power source in series with the first membrane electrode assembly.

In one embodiment, which may be combined with any of the preceding embodiments, the present invention relates to a method of generating electricity using the heat to electricity converter described above as a heat engine. The method comprises coupling the first membrane electrode assembly to a heat source at a first temperature and coupling the second membrane electrode assembly to a heat sink at a second temperature, the first temperature being higher than the second temperature, applying electrical power to the second membrane electrode assembly to pump the working fluid from the second pressure to the first pressure with heat being removed at the second temperature and a first voltage, and extracting power from the first membrane electrode assembly as the working fluid expands from the first pressure to the second pressure with heat being supplied thereto at the first temperature and a second voltage, the second voltage being higher than the first voltage.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings:

FIG. 3 is a table identifying several commercially available hydrogen permeable metal alloys;

FIG. 6 shows a plurality of heat-to-electric converter tubes operating between high- and low-temperature working fluid flow streams, in accordance with another embodiment of the present invention.

DETAILED DESCRIPTION OF THE INVENTION

Figure 1:
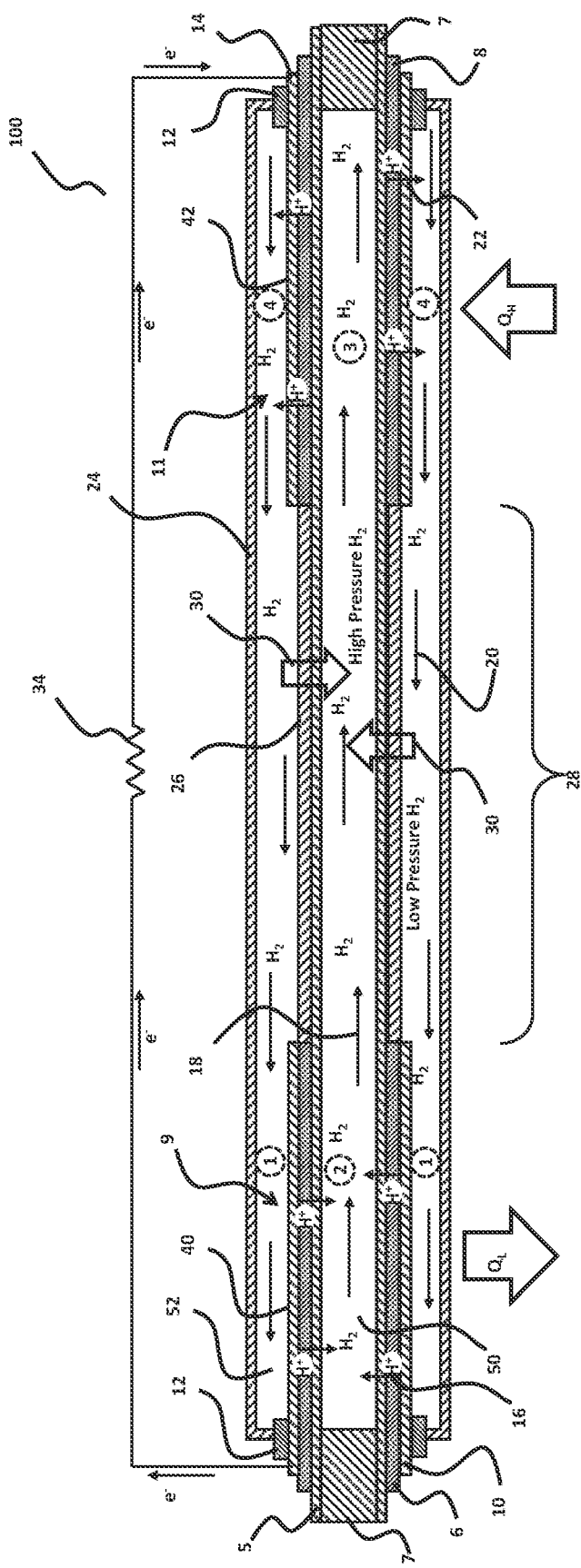
FIG. 1 is a cross-sectional view of a thermo-electrochemical converter including two thin film membrane electrode assemblies, in accordance with an embodiment of the present invention.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import. It will also be understood that terms such as "first," "second," and the like are provided only for purposes of clarity. The elements or components identified by these terms, and the operations thereof, may easily be switched.

The present invention generally relates to an improved thin film membrane electrode assembly, particularly for use in a thermo-electrochemical converter. More particularly, the present invention relates to a thermo-electrochemical converter having an ionizable working fluid and at least one electrochemical concentration cell including an MEA comprised of a thin film electrolyte layer and at least one electrode, and more preferably a pair of electrodes which sandwich the thin film electrolyte layer.

Referring to FIG. 1, there is shown a converter 100 in accordance with one embodiment of the present invention. The converter 100 includes a first electrochemical cell 9 and a second electrochemical cell 11. Each cell 9, 11 includes an ion conductive MEA comprising an ion conductive membrane sandwiched between two electrodes. More particularly, the first electrochemical cell 9 comprises a first MEA 40 and the second electrochemical cell 11 comprises a first MEA 42. The first and second MEAS 40, 42 both have generally tubular structures, meaning that the electrodes and membranes thereof, which will be described in further detail herein, have tubular configurations. It will be understood by those skilled in the art that each cell may comprise more than one MEA and that the MEA(s) need not have a tubular configuration. In the converter 100 of FIG. 1, the first electrochemical cell 9 is coupled to a heat sink $Q_L$ and the second electrochemical cell 11 is coupled to heat source $Q_H$. The heat sink $Q_L$ and the heat source $Q_H$ are at different temperatures, as will be discussed in greater detail herein.

The first MEA 40 of the first electrochemical cell 9 comprises a membrane 6 situated between a first electrode 5 and a second electrode 10. The first MEA 42 of the second electrochemical cell 11 comprises a membrane 8 situated between the first electrode 5 and a second electrode 14. The membranes 6, 8 and the electrodes 5, 10, 14 all have a tubular configuration (the cross-sectional view being shown in FIG. 1).

Each membrane 6, 8, is an ion conductive membrane. More preferably, each membrane 6, 8, is in the form of a thin film electrolyte layer, and most preferably a dense thin film electrolyte layer. Preferably, each thin film electrolyte membrane 6, 8 has a thickness of less than 10 μm, and more preferably from 0.03 μm to 10 μm. Preferably, each thin film electrolyte membrane 6, 8 is conductive of ions of the working fluid. More particularly, the dense, thin film electrolyte layer 6, 8 is preferably non-porous and conductive of ions of the working fluid, while being substantially impermeable to non-ionized constituents of the working fluid. The ion conductive membranes 6, 8 therefore limit diffusion therethrough of the working fluid that has not been ionized. The thin film electrolyte structure of each MEA 40, 42 allows the thermo-electrochemical converter 100 to achieve high power density, even when using electrolyte materials having relatively low ionic conductivity.

Figure 7:
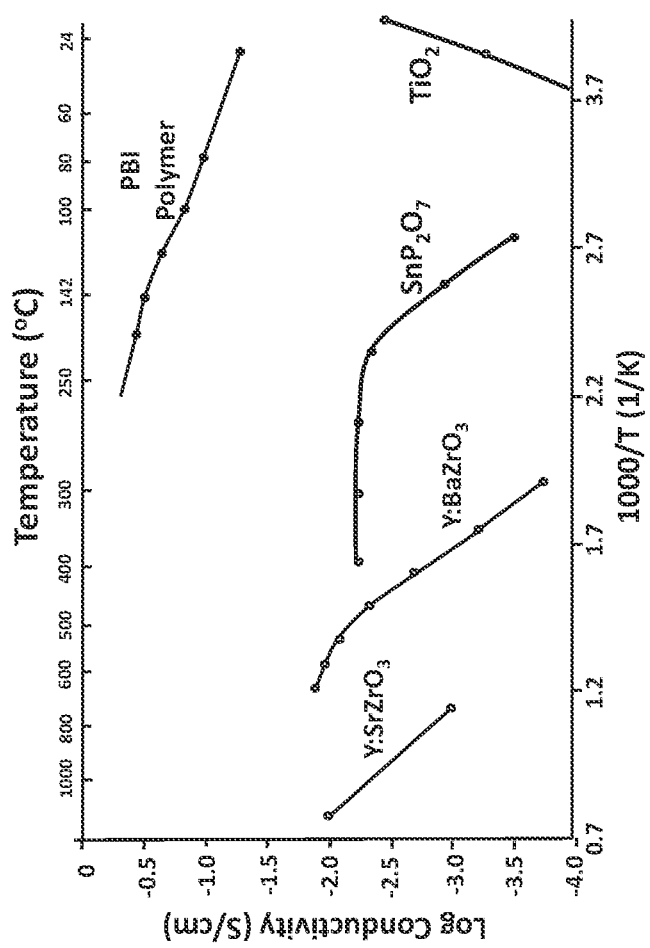
FIG. 7 is a graphical depiction of several exemplary proton conductive materials there suitable for use as the electrolyte material to form the ion conductive membranes, according to embodiments of the present invention.

Referring to FIG. 7, there are shown various exemplary proton conductive materials that are suitable for use as the electrolyte material to form the ion conductive membranes in the present invention. These materials shown in FIG. 7 are particularly suitable for use where hydrogen is utilized as the working fluid. Based on the data provided in FIG. 7, the optimum material may be selected for a given application, primarily based on maximizing conductivity for the targeted operating temperature of the membranes. Several of the preferred membrane/electrolyte materials of FIG. 7 are oxides. The preferred membrane/electrolyte materials of FIG. 7 are suitable for application by sputtering or another physical deposition method. Polybenzimidazole (PBI) is a preferred polymer, and thus may be applied by extrusion or another polymer coating technique.

The first electrode 5 and the second electrodes 10, 14 are preferably conductive of electrons and are permeable to the ionizable working fluid. Permeability of the electrodes 5, 10, 14 may be by atomic or molecular diffusion through a non-porous electrode material, or the electrodes 5, 10, 14 may be permeable due to porosity. In one embodiment, at least one of the electrodes 5, 10, 14 may comprise one or more additives to promote the conductivity of electrons and/or one or more catalysts to promote the desired electrochemical reactions.

Preferably, at least one of the first electrode 5 and the second electrode 10 of the MEA 40 and at least one of the first electrode 5 and the second electrode 14 of the MEA 42 comprises a non-porous metal, and more preferably a non-porous and dense metal. More preferably, both electrodes 5, 10 and 5, 14 of both MEAs 40, 42 comprise a non-porous metal, and more preferably a non-porous and dense metal. In preferred embodiments, at least one of the electrodes 5, 10, 14, and more preferably all of the electrodes 5, 10, 14, comprises a solid, non-porous metal or a nano-porous material as a support for the thin film electrolyte layer 6, 8.

More particularly, in one embodiment, at least one of the electrodes 5, 10, 14 comprises a nano-porous material mounted or coated on a substrate which provides mechanical support to the nano-porous material, thereby forming a nano-porous electrode, with the thin film electrolyte supported directly on the nano-porous material. In one embodiment, the substrate is a porous substrate. The nano-porous electrode preferably has a surface smoothness that is sufficient to function as a substrate for a thin film electrolyte coating having a thickness from 0.03 µm to 10 µm. Such an electrode may be comprised of, for example, microporous carbon or nano-porous carbon. Examples of such microporous or nanoporous carbon electrodes and how they are formed are disclosed in U.S. Pat. No. 9,046,784 of Wang et. al., U.S. Pat. No. 6,632,849 of Yao et. al., and a publication by Kondyurin, et. al. titled "Nanostructured Carbonized Thin Films Produced by Plasma Immersion Ion Implantation of Block-Copolymer Assemblies," (pages 155-160), Version of Record online: 29 Oct. 2007 DOI: 10.1002/ppap.200700111. The substrate may be, for example, a silicon sheet, a glass sheet, or a metal sheet.

In another embodiment, at least one of the electrodes 5, 10, 14 comprises a non-porous material mounted on a substrate which provides mechanical support to the non-porous material, thereby forming a non-porous electrode, with the thin film electrolyte supported on the non-porous material. In one embodiment, the substrate is a porous substrate. Preferably, at least one of the electrodes 5, 10, 14 comprises a non-porous metal material mounted on a porous electrode substrate, thereby forming a non-porous metal electrode, with the thin film electrolyte supported on the non-porous metal material. More particularly, at least one of the electrodes 5, 10, 14 may comprise a thin, non-porous metal film that is permeable to the working fluid supported on a porous substrate.

Alternatively, at least one of the electrodes 5, 10, 14 comprises a dense, self-supporting metal sheet or foil that is permeable to the working fluid.

In one embodiment, each porous electrode 5, 10, 14 may optionally include a working fluid permeable dense metal coating on the surface of the metal substrate at the interface with the electrolyte membrane 6, 8. The dense metal coating may include catalyst to promote oxidation and reduction as the working fluid enters and exits the electrolyte membrane 6, 8. Further, the metal coating may be supported by an electronically conductive or non-conductive porous substrate, such as porous anodized aluminum (Whatman Anodise™ available at SigmaAldrich, U.S.) or a conductive material, such nickel foam.

Figure 2:
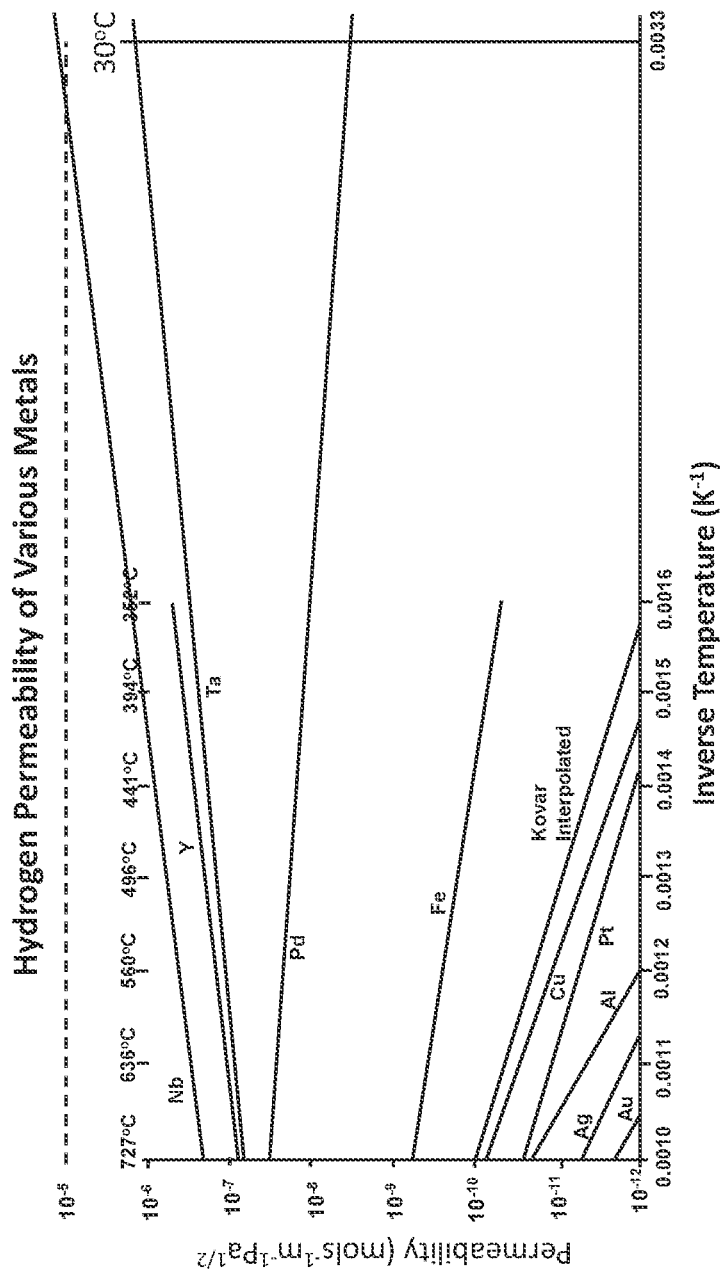
FIG. 2 is a graphical depiction of the hydrogen permeability of several metals suitable for use as electrodes of the thin film membrane electrode assemblies of the converter, according to embodiments of the present invention.

Metal alloys and laminates, in particular, which are permeable to the working fluid, are preferred for forming the electrodes 5, 10, 14. Referring to FIG. 2, there are shown several different metals that may be suitable for use as the electrodes 5, 10, 14 of the present invention. More particularly, FIG. 2 shows the hydrogen permeability of several metals. Palladium and palladium alloys are preferred, particularly where hydrogen is the working fluid. While there are many metals that have higher permeability than palladium, these other materials tend to fail due to embrittlement when placed in hydrogen environments. Palladium, on the other hand, remains stable and has catalytic properties for promoting hydrogen reactions. Palladium has also been established as a suitable catalyzing support substrate for thin electrolyte coatings. However, in addition to comprising the anode and catalyzing entering hydrogen molecules, palladium also catalyzes reduction reactions of the electrolyte at the electrolyte interface. Thus, it has been found to be beneficial to include a less reactive interface layer between the palladium and the electrode.

For example, Ni/Pd foil with a Ni layer of 600 nm thickness shows hydrogen permeability of about $5 \times 10^{-9}$ mol $s^{-1}$ $m^{-1}$ $pa^{-0.5}$ at 400° C., a rate which is half of the permeability of the pure Pd foil. This value is sufficient to give the external current of at least 2 A cm$^2$ in a fuel cell. See "Thin Film Fuel Cell Based on Nanometer-Thick Membrane of Amorphous Zirconium Phosphate Electrolyte" (Journal of The Electrochemical Society, 158 (8) B866-B870 (2011) 0013-4651/2011/158(8)/B866/5, The Electrochemical Society).

Efforts towards the use of solid metal electrodes for fuel cell applications has been very limited compared to the extensive work performed towards development of membranes for hydrogen separation/production applications. FIG. 3 lists several commercially available hydrogen permeable metal alloys, originally provided in Yin et al., "A Review on the Production and Purification of Biomass-Derived Hydrogen Using Emerging Membrane Technologies", *Catalyst* (6 Oct. 2017). The addition of silver and/or other alloying metals improve the mechanical strength and stability of palladium-based membranes. For example, alloying silver into palladium can enhance the permeability of the membrane up to 5 times compared to pure Pd membranes. One study, performed by Tanaka et al. "Preparation And Characterization Of Ceramic Supported Ultra-Thin (approximately 1 µm) Pd—Ag Membranes", D.A.P.J. Member. Sci. 2017, 528, 12-23) analyzed an ultra-thin (approximately 1 µm) Pd—Ag membrane produced by a simultaneous ELP method, and found that the membrane had a H$_2$ permeance of 9.0 to $9.4 \times 10^{-6}$ mol·m$^{-2}$ s$^{-1}$ Pa$^{-1}$ and H$_2$/N$_2$ selectivity between 3300 and 2000 at 400° C.

Each MEA 40, 42 may be constructed by applying a thin film coating of an electrolyte material onto an electrode which is permeable to the working fluid. For example, the thin film electrolyte layer or membrane 6, 8 may be coated onto a first electrode by sputter deposition, laser ablation, chemical vapor deposition or any other known thin film deposition technique. The thin film electrolyte layer or membrane 6, 8 may also be applied onto the first electrode by spin coating using a nano-particle slurry of the electrolyte material, by sol gel or even by atomic layer deposition techniques. For polymer-based electrolyte films, ink jet printing, solvent casting or spin coating are some of the known application techniques that may be used to form the thin film electrolyte membrane 6, 8. After formation of the thin film electrolyte membrane 6, 8 on one of the electrodes 5, 10, 14, another electrode 5, 10, 14 is applied on top of the thin film electrolyte membrane 6, 8 to complete the MEA 40, 42. In one embodiment, one or both of the electrodes 5, 10, 14 of the MEAs 40, 42 may include a catalytic material in order to promote oxidation and reduction of the working fluid at the electrode-electrolyte interfaces, or alternatively, the material of the electrode(s) itself may be catalytic to promote these reactions.

In one embodiment, after the second electrode is applied on top of the thin film electrolyte membrane 6, 8, the assembled structure may be folded or rolled to form a MEA 40, 42 of a tubular configuration.

In one preferred embodiment, the working fluid is in gas form. In one preferred embodiment, the working fluid is hydrogen. As such, each concentration cell 9, 11 includes a MEA 40, 42 comprised of a proton conductive electrolyte material sandwiched between two electrodes which are conductive of electrons and permeable to hydrogen. For a converter in which hydrogen is the working fluid, suitable high permeable metals for the electrodes of each MEA include, but are not limited to, palladium, niobium, yttrium, tantalum and alloys thereof, including alloys with silver and/or copper. The proton conductive electrolyte material of each MEA is in the form of a thin film membrane having a thickness of 0.03 µm to 10 µm, sandwiched between the two hydrogen permeable electrodes.

The disclosure provided herein primarily uses hydrogen as an example of the working fluid. However, it will be understood by those skilled in the art that the present invention is not intended to be limited to hydrogen as the working fluid. Indeed, the principles described herein will apply to other ionizable working fluids as well.

In the embodiment of FIG. 1, the converter 100 has a tubular structure, such that the MEAs of the converter 100 also have a generally tubular structure. However, it will be understood by those skilled in the art that the present invention does not require the MEAs to be configured as such. For example, the MEAs could have a flat, layered structure and/or be arranged in a stacked configuration. The description provided herein, however, will focus on a converter of a tubular configuration.

In the embodiment of FIG. 1, the first electrode 5 extends from the MEA 40 of the first electrochemical cell 9 to the MEA 42 of the second electrochemical cell 11. As such, in the embodiment of FIG. 1, the first electrode 5 is common, and more particularly electrically common, to the MEAs 40, 42 of both the first and second electrochemical cells 9, 11. As noted above, the first electrode 5 of the MEAs 40, 42 has a tubular form, such that a passageway or conduit 50 is formed within the interior of the tubular electrode 5 and extends between the first and second electrochemical cells 9, 11. The distal ends of this conduit 50 are closed off by plugs 7. More particularly, the first electrode 5 of the MEAs 40, 42 and the plugs 7 collectively define a closed conduit 50 that couples working fluid flow between the first and second electrochemical cells 9, 11.

The MEAs 40, 42 are at least partially enclosed in or surrounded by an outer housing, preferably an outer tubular housing, 24. A sealing ring 12 may optionally be provided to ensure an airtight or near-airtight seal between the MEAs 40, 42 and the outer housing 24. The conduit 50 is situated within and traverses the length of the outer enclosure 24. As such, the outer housing 24 is divided into separate chambers, a first or inner chamber within the conduit 50 and a second or outer chamber surrounding the conduit 50. As such, the outer chamber is essentially a second conduit 52. The first conduit 50 is directly in contact with the first electrode 5, while the second conduit 52 is directly in contact with the second electrode 10 of the MEA 40 of the first cell 9 and with the second electrode 14 of the MEA 42 of the second cell 11.

Figure 4:
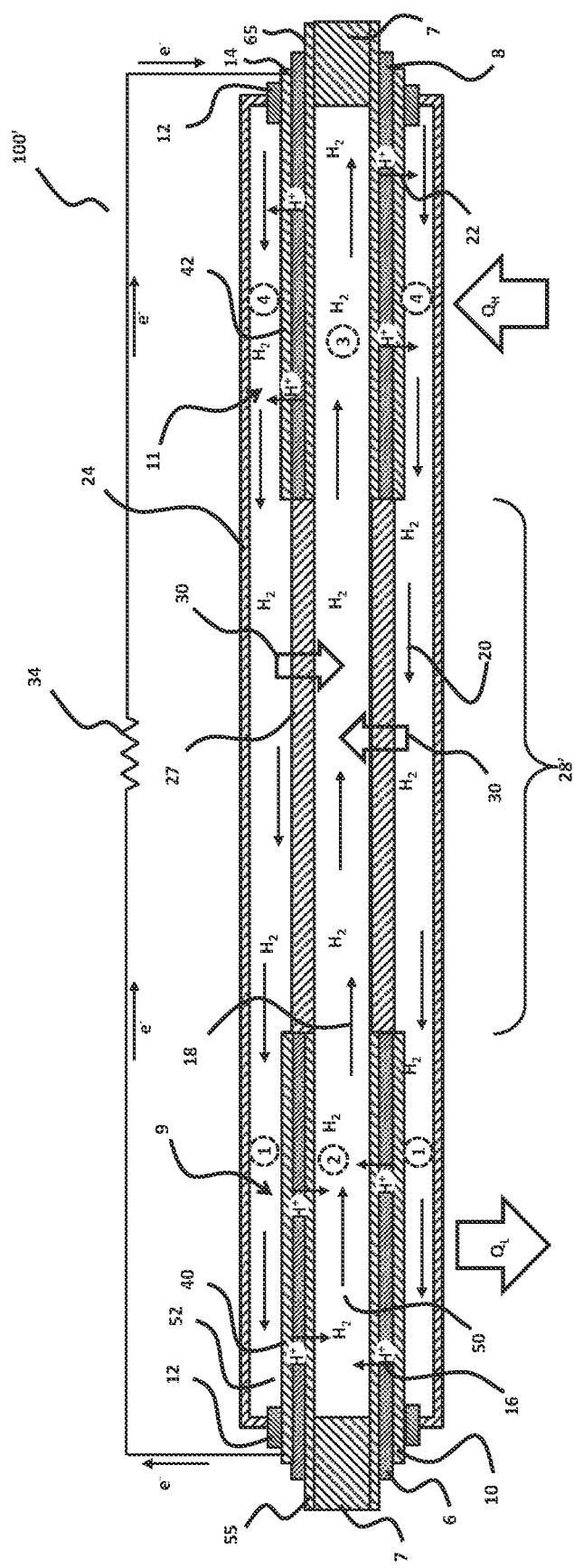
FIG. 4 is a cross-sectional view of a thermo-electrochemical converter including two thin film membrane electrode assemblies, in accordance with another embodiment of the present invention.

In one embodiment, the first and second conduits 50, 52 have a concentric arrangement, with the first conduit 50 being subsumed within the second conduit 52. The second conduit 52 also couples working fluid flow between the first and second electrochemical cells 9, 11. As shown in FIGS. 1 and 4, the first and second electrochemical cells 9, 11 and indeed the entire converter 100 may be configured as concentric tubular structures, particularly with concentric tubular conduits 50, 52. Concentric tubular structures are advantageous in that containment pressures stresses are primarily tension and compression, which enables the use of minimal wall thicknesses.

The converter 100 is configured such that one electrode of each MEA 40, 42 is maintained at a relatively low-pressure state and the other electrode of each MEA 40, 42 is maintained at a relatively high-pressure state. It will be understood by those skilled in the art that the terms "high-pressure" and "high-concentration" are used interchangeably herein with respect to the working fluid. It will also be understood by those skilled in the art that the terms "low-pressure" and "low-concentration" are also used interchangeably with respect to the working fluid. Preferably, the high-concentration (i.e., high-pressure) sides of the two electrochemical concentration cells 9, 11 are connected to each other by a high-pressure conduit (i.e., a conduit maintained at a relatively high-pressure) and the low-concentration (i.e., low-pressure) sides of the two electrochemical concentration cells 9, 11 are coupled to each other by a low-pressure conduit (i.e., a conduit maintained at a relatively high-pressure).

More particularly, in the converter 100 of FIG. 1, the first electrode 5 of the MEAs 40, 42 is maintained at a relatively high-pressure state and thus constitutes a high-pressure side of the converter 100. Thus, the first conduit 50 couples working fluid flow at a high-pressure state between the first electrochemical cell 9 and the second electrochemical cell 11. The second electrodes 10, 14 of the MEAs 40, 42 are maintained at a relatively low-pressure state and thus constitute a low-pressure side of the converter 100. Thus, the second conduit 52 couples working fluid flow at a low-pressure state between the first electrochemical cell 9 and the second electrochemical cell 11.

Referring to FIG. 1, the midsection 28 of the converter 100 functions as a recuperative heat exchanger connecting working fluid flow between the two electrochemical cells 9, 11. In the midsection 28 of the converter 100 of the embodiment of FIG. 1, a barrier layer or coating 26 is provided over the exterior length of the electrode 5 which spans the midsection 28 (i.e., the area between the first and second cells 9, 11). The barrier coating 26 prevents hydrogen permeation through the hydrogen permeable material of electrode 5 in the midsection 28 area.

Alternatively, as shown in FIG. 4, the cells 9, 11 need not have an electrically common electrode 5. The converter 100' of FIG. 4 and operation thereof is identical to that of the converter 100 of FIG. 1, except in the following aspects. Each MEA 40, 42 includes distinct electrodes. Thus, the MEA 40 of the first electrochemical cell 9 comprises a membrane 6 sandwiched between a first electrode 55 and a second electrode 10, and the MEA 42 of the second electrochemical cell 11 comprises a membrane 8 sandwiched between a first electrode 65 and a second electrode 14, with the first electrodes 55 and 65 being separate and distinct from each other. In the midsection 28, a tubular member 27 is provided and extends between the first electrodes 55, 65. The tubular member 27 is preferably made of a material that is not permeable to the working fluid. More particularly, the tubular member 27 preferably accommodates heat transfer while preventing working fluid passive diffusion from the high-pressure state to the low-pressure state without undergoing an electrochemical reaction. Thus, in the embodiment of FIG. 4, the conduit 50 is formed within the collective interior of the tubular member 27, the first electrode 55 of the MEA 40 of the first cell 9, and the first electrode 65 of the MEA 42 of the second cell 11.

Referring to FIG. 1, one of the electrochemical concentration cells 9, 11 receives heat input at an elevated temperature, for example by connection to a heat source $Q_H$, and operates to convert heat into electrical power by expanding an ionizable working fluid from a high concentration or pressure to a low concentration or pressure, with the expansion being conducted under the Nernst potential of the cell. This cell is referred to herein as a "high-temperature cell" or "high-temperature MEA". The other electrochemical concentration cell 9, 11 is preferably connected to a heat sink $Q_L$ and operates on electrical power input to pump and compress the ionizable working fluid from the low concentration or pressure back to the high concentration or pressure, with the compression being conducted under an applied voltage that exceeds the cells Nernst potential. Electrical power is consumed by the compression process and the heat of compression is rejected. This cell is referred to herein as a "low-temperature cell" or "low-temperature MEA".

More particularly, in one embodiment, wherein the MEAs 40, 42 operate as part of a heat engine, the heat source $Q_H$ to which the MEA 42 of the second cell 11 is coupled is preferably at an elevated temperature relative to the temperature of the heat sink $Q_L$ to which the MEA 40 of the first cell 9 is coupled. As such, the high-temperature MEA 42 has a higher Nernst voltage than the low-temperature MEA 40. Operation of the engine 100 is such that working fluid is compressed from the low-pressure electrode 10 to the high-pressure electrode 5 of the MEA 40 in the low-temperature concentration cell 9. The compressed working fluid is then supplied by the high-pressure conduit 50 to the high-pressure electrode 5 of the MEA 42 of the high-temperature concentration cell 11. The working fluid is expanded through the MEA 42 of the high-temperature cell 11 as it passes through the thin film electrolyte membrane 8 from the high-pressure electrode 5 to the low-pressure electrode 14. Subsequently, the working fluid is supplied by the low-pressure conduit 52 back to the low-pressure electrode 10 of the low temperature concentration cell 9. The voltage generated by the high-temperature MEA 42 is high enough to overcome the Nernst voltage of the low-temperature MEA 40, and to have sufficient voltage left over to power an external load 34 connected in series.

More particularly, the converter 100, 100' of FIGS. 1 and 4 operates as a heat engine, as follows. Beginning at a low-temperature, low-pressure state 1, electrical energy is supplied to the low-temperature MEA 40 to pump working fluid flow 16 across the MEA 40 from the low-pressure, low-temperature state 1 to a high-pressure, low-temperature state 2. The temperature of the working fluid is maintained nearly constant by removing heat $Q_L$ from the proton conductive membrane 6 during the compression process. The thin membrane 6, which is preferably less than 10 μm in thickness, will not support a significant temperature gradient, so the near isothermal assumption for the process is valid, provided adequate heat is transferred to the membrane 6 and its substrate. From high-pressure, low-temperature state 2, the working fluid passes through the recuperative, counter flow heat exchanger (i.e., midsection 28) as flow 18, where it is heated under approximately constant pressure to a high-temperature, high-pressure state 3, and then flows to the high-temperature MEA 42. The heat 30 needed to elevate the temperature of the working fluid from high-pressure, low-temperature state 2 to high-pressure, high-temperature state 3 is transferred from working fluid 20 flowing in the opposite direction in the heat exchanger. More particularly, the midsection 28 serves to couple heat 30 from the working fluid flow 20 leaving the high-temperature MEA 42 and flowing within conduit 52 to the working fluid flow 18 travelling to the high-temperature MEA 42 within conduit 50. At the high-temperature MEA 42, electrical power is generated as the working fluid flow 22 travels across the MEA 42 and expands from the high-pressure, high-temperature state 3 to a low-pressure, high-temperature state 4. Heat $Q_H$ is supplied to the MEA 42 to maintain a near constant temperature as the working fluid expands. To transition from low-pressure, high-temperature state 4 back to low-pressure, low-temperature state 1, the working fluid flows 20 through the recuperative heat exchanger (i.e., midsection 28) where its temperature is lowered in a constant pressure process by heat transfer to working fluid 18 passing from high-pressure, low-temperature state 2 to high-pressure, high-temperature 3. The cycle continues as working fluid is pumped by the low-temperature MEA 40 from low pressure to high pressure.

During operation of the converter 100, 100', the working fluid is compressed in the low-temperature electrochemical cell 9 by supplying current at a voltage that is sufficient to overcome its Nernst potential, thereby driving the working fluid from the low-pressure side of the membrane 6 to the high-pressure side. On the other hand, the working fluid is expanded in the high-temperature electrochemical cell 11 as current (power) is extracted under its Nernst potential. In high-temperature electrochemical cell 11, electrical current flow is generated as the working fluid expands from the high-pressure side of the membrane 8 to the low-pressure side. As in any thermodynamic engine employing a working fluid and consistent with the nature of compressible gas, in the converter 100, a greater amount of work (electricity) is extracted during high-temperature expansion than the work (electricity) input required for the low-temperature compression. The difference in heat energy input to the converter 100 to maintain constant temperature during high-temperature expansion versus the heat energy removed to maintain constant temperature during low-temperature compression is provided as the difference in electrical energy output by the high temperature expansion process versus that consumed by the low-temperature compression process.

Consistent with the Nernst equation, the high-temperature electrochemical cell 11 will have a higher voltage than the low-temperature electrochemical cell 9. Since the current (I) is the same through both cells, the voltage differential means that the power generated through the expansion of working fluid in the high-temperature electrochemical cell 11 is higher than that of the low-temperature electrochemical cell 9. The power output by the high-temperature electrochemical cell 11 ($V_{HT}*I$) is sufficient to drive the compression process in the low-temperature electrochemical cell 9 ($V_{LT}*I$) as well as supply net power output to an external load 34 (($V_{HT}$*I)−($V_{LT}$*I)). This voltage differential provides the basis for the operation of the converter 100.

In another embodiment, in which the MEAS 40, 42 operate as part of a heat pump application, the heat source $Q_H$ to which the MEA 42 of the second cell 11 is coupled is at a reduced temperature relative to the heat sink $Q_L$ to which the MEA 40 of the first cell 9 is coupled. Thus, the working fluid is expanded at a low temperature in the MEA 42 coupled to the heat source $Q_H$, as the heat of expansion is extracted from the low temperature heat source $Q_H$. The working fluid is compressed at a high temperature in the MEA 40 coupled to the heat sink $Q_L$, and the heat of compression is rejected at the elevated temperature. Because of its low operating temperature, the low-temperature, expansion MEA 42 produces a Nernst voltage that is less than that of the high-temperature, compression MEA 40. An external power source is therefore connected in series with the low-temperature MEA 42 in order to provide a combined voltage that is high enough to overcome the Nernst potential of the high-temperature MEA 40, and thereby drive the compression process therein.

Figure 5A:
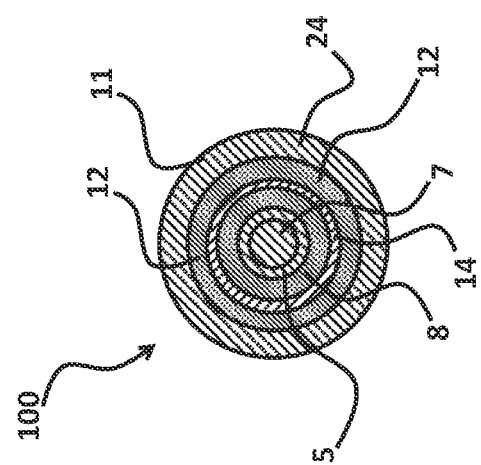
FIG. 5A is a top plan view of the converter shown in FIG. 1.
Figure 5B:
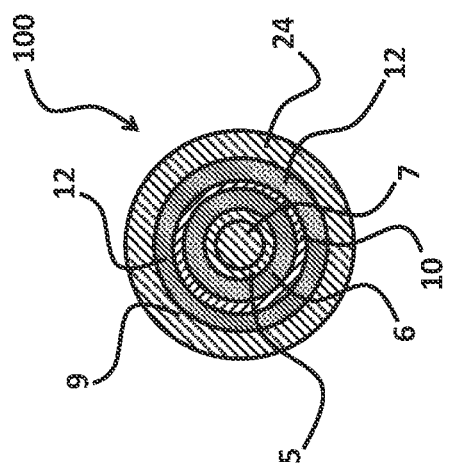
FIG. 5B is a bottom plan view of the converter shown in FIG. 1.

FIGS. 5A-5B show an end views of the converter 100 configured as tubular structures. A tubular-structured converter 100 is appealing for functioning as an active heat pipe for heat transport as a power generator or as a heat pump. As such, the converter 100 may be configured having a relatively small diameter tubular structure, whereby multiple tubes may be arranged to form a structure that resembles a bank of "heat pipes" being used to transfer heat between a heat source and a heat sink, as shown in FIG. 6.

More particularly, referring to FIG. 6, there is shown a bank of heat-to-electric converter tubes coupled between a high-temperature working fluid flow stream 32 (i.e., the heat source) and a low-temperature working fluid flow stream 30 (i.e., the heat sink). High-temperature MEA 4211, for expansion of the working fluid, are exposed to and heated by the high-temperature working fluid flow 32 and the low-temperature MEAs 40, for compression of the working fluid, are exposed to and cooled by the low-temperature fluid stream 30. The high- and low-temperature working fluid streams 32, 30 are isolated from each other by recuperative heat exchanger section 38, as working fluid flow within individual heat exchangers 28 of each converter tube couple flow within the concentric tubes thereof between the respective low-temperature MEA 40 and the respective high-temperature MEA 42.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A heat to electricity converter comprising:
an ionizable working fluid; and
a first membrane electrode assembly and a second membrane electrode assembly electrically coupled to each other, each membrane electrode assembly comprising:
a first electrode which is conductive of electrons and permeable to the ionizable working fluid,
a second electrode which is conductive of electrons and permeable to the ionizable working fluid, and
a thin film electrolyte membrane sandwiched between the first electrode and the second electrode, the thin film electrolyte membrane being conductive of ions of the ionizable working fluid and having a thickness of 0.03 μm to 10 μm,
wherein at least one of the first and second electrodes of each membrane electrode assembly comprises a non-porous and dense metal,
wherein, due to a working fluid pressure differential applied across each membrane electrode assembly, one of the first and second electrodes of each membrane electrode assembly is in contact with the working fluid at a first pressure and the other of the first and second electrodes of each membrane electrode assembly is in contact with the working fluid at a second pressure which is lower than the first pressure, and
wherein the first membrane electrode assembly is configured to compress the working fluid from the second pressure to the first pressure, and
wherein the second membrane electrode assembly is configured to expand the working fluid from the first pressure to the second pressure.

2. The heat to electricity converter according to claim 1, wherein the non-porous and dense metal is layered or mounted onto a porous substrate.

3. The heat to electricity converter according to claim 1, wherein at least one of the first and second electrodes of at least one of the first and second membrane electrode assemblies comprises a catalyst configured to promote oxidation and reduction of the working fluid as the working fluid passes through the respective thin film electrolyte membrane.

4. The heat to electricity converter according to claim 1, wherein at least one of the first and second electrodes of at least one of the first and second membrane electrode assemblies comprises palladium or an alloy thereof.

5. The heat to electricity converter according to claim 1, further comprising a recuperative heat exchanger which couples flow of the working fluid at the first pressure and the second pressure between the first and second membrane electrode assemblies.

6. The heat to electricity converter according to claim 1, wherein the converter has a tubular configuration.

7. The heat to electricity converter according to claim 6, wherein each of the first and second membrane electrode assemblies has a tubular configuration.

8. The heat to electricity converter according to claim 7, wherein an interior of each of the first and second membrane electrode assemblies constitutes a first conduit for flow of the working fluid at the first pressure.

9. The heat to electricity converter according to claim 8, further comprising a housing at least partially surrounding the first and second membrane electrode assemblies, a space between the first and second membrane electrode assemblies and the housing constituting a second conduit for flow of the working fluid at the second pressure.

10. The heat to electricity converter according to claim 1, wherein one of the first and second electrodes is electrically common to both of the first and second membrane electrode assemblies.

11. The heat to electricity converter according to claim 1, further comprising an external circuit for electrically coupling the first and second membrane electrode assemblies.

12. The heat to electricity converter system comprising a plurality of converters according to claim 6 coupled between a first stream of the working fluid at a first temperature and a second stream of the working fluid at a second temperature which is lower than the first temperature.

13. A method of generating electricity using the heat to electricity converter according to claim 1 as a heat pump, the method comprising:
- coupling the first membrane electrode assembly to a heat sink at a first temperature and coupling the second membrane electrode assembly to a heat source at a second temperature, the first temperature being higher than the second temperature;
- applying electrical power to the first membrane electrode assembly to pump the working fluid from the second pressure to the first pressure with heat being removed at the first temperature and a first voltage; and
- extracting power from the second membrane electrode assembly as the working fluid expands from the first pressure to the second pressure with heat being supplied thereto at the second temperature and a second voltage, the first voltage being higher than the second voltage.

14. The method according to claim 13, further comprising connecting an external power source in series with the second membrane electrode assembly.

15. A method of generating electricity using the heat to electricity converter according to claim 1 as a heat engine, the method comprising:
- coupling the first membrane electrode assembly to a heat sink at a first temperature and coupling the second membrane electrode assembly to a heat source at a second temperature, the first temperature being lower than the second temperature;
- applying electrical power to the first membrane electrode assembly to pump the working fluid from the second pressure to the first pressure with heat being removed at the first temperature and a first voltage; and
- extracting power from the second membrane electrode assembly as the working fluid expands from the first pressure to the second pressure with heat being supplied thereto at the second temperature and a second voltage, the second voltage being higher than the first voltage.

\* \* \* \* \*